April 26, 1932.   A. G. VON SODEN-FRAUNHOFEN ET AL   1,856,007
ONE-WAY DRIVE POWER TRANSMISSION
Filed Jan. 11, 1929

Inventors:

Patented Apr. 26, 1932

1,856,007

UNITED STATES PATENT OFFICE

ALFRED GRAF VON SODEN-FRAUNHOFEN AND HUBERT FREIHERR VON THÜNGEN, OF FRIEDRICHSHAFEN, GERMANY, ASSIGNORS TO ZAHNRADFABRIK AKTIENGESELLSCHAFT FRIEDRICHSHAFEN, OF FRIEDRICHSHAFEN, GERMANY

ONE-WAY DRIVE POWER TRANSMISSION

Application filed January 11, 1929, Serial No. 331,820, and in Germany January 26, 1928.

Our invention relates to one way drive power transmission and has special reference to transmissions of this kind which are used in motor cars.

Generally such transmissions have cams, eccentrics and the like situated on the driving shaft which by their revolutions transmit a rocking or oscillating movement to levers of one way drive mechanisms. These latter mechanisms are well known and our invention in no way refers to the details of their design or construction. Any kind of them which works with oscillating levers may be used in connection with our invention.

The main object of our invention is that we make the transmission adjust itself automatically in dependency on the number of revolutions of the driving shaft, and simultaneously in dependency on the resistance offered by the driven shaft.

For this purpose we use cams, eccentrics and the like which are variable in their height or eccentricity so that the stroke of the one way drive lever on which they act also varies in accordance therewith. This variation in the cams or eccentrics can be caused for instance by centrifugal force.

In addition thereto we provide means for having the resistance offered by the driven shaft cause a variation in the height of the cams or in the eccentricity, also.

The simplest way of effecting this is to let the centrifugal force cause an increase in height or eccentricity, so that the oscillation of the levers also increases with faster rotation of the driving shaft, whereas the resistance of or load on the driven shaft works towards decrease in height and in eccentricity and thus causes shorter strokes of the oscillating levers of the one way drive mechanisms.

Of course the centrifugal force may be limited in its effect to any desired or adequate extent, or means may be provided which eliminate the centrifugal force for a certain time period or under special circumstances; such means may also have merely an adjusting influence, as for example springs or the like.

This entire arrangement according to our invention has the advantage that automatically an adjustment takes place between the number of revolutions of the driving shaft and the resistance offered by the driven shaft in such manner that always and at every instant the most suitable relation is prevailing. Thus it is possible, for instance, to make a car slowly climb up a slope with reduced performance of the motor running at a low number of revolutions, which is impossible when regulating exclusively in accordance with the resistance of the driven shaft.

Having given a general description of our invention we now want to point it out more in detail referring to the drawings which represent examples embodying our invention.

Figs. 1 and 2 represent in a mere diagrammatical manner the means which are necessary for reducing our invention to practice and the relative position of its component parts, whereas

Fig. 1 is a side view, partly in section, on the disc represented in front view in Fig. 2.

Fig. 3 is a section along line A—A of Fig. 4, seen in the direction of the indicating arrows. Fig. 4 is a vertical section along the broken line B—B of Fig. 3.

Figure 1:
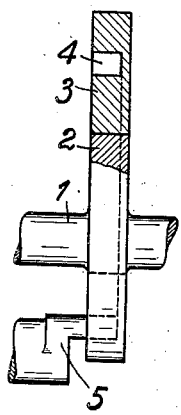
Figure 2:
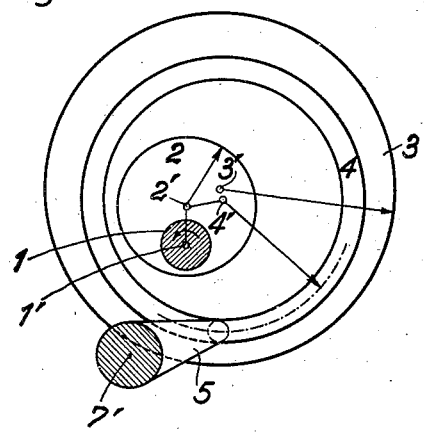

To the driving shaft 1 with its centre at 1', an eccentric disc 2 is rigidly connected which has its centre at 2'. Eccentrically to this disc 2 another disc 3 is loosely mounted thereon so that it can revolve around disc 2. Its centre is 3'. It has an eccentric annular groove 4, having its centre at 4'. The eccentricity 1' to 2' is equal to 2' to 4', so that on adequate turning of disc 3 with regard to disc 2 the centre points 1' and 4' can be brought to coincide. The resulting eccentricity then becomes zero, so that the idling position is taken. For the purpose of having a centrifugal force even then, the outer circumference of disc 3 is made eccentric, as described above. The same effect can be reached by adding an eccentric weight to this disc 3, or generally speaking, by shaving it so that its centre of gravity is eccentric to centre 4' of the groove 4. Into this groove 4 fits a pin of lever 5 adapted to rock or oscillate around centre 7', which is the centre of a uni-directional or one way drive mechanism of any well-known design or construction, not represented in Figs. 1 and 2. There may be arranged several of such one way drive mechanisms around the centre of the driving shaft so that their centres 7' are concentric to centre 1' of the shaft. These one way drive mechanisms by means of intermediate members, such as levers, gears and so on, work on a driven shaft. All these one way drive arrangements are well known and do not per se constitute a feature of our invention.

Of course the driven shaft offers a certain resistance varying with the desired performance of or load on the driven car, for example. This resistance or load always tends to set levers 5 so that their rocking or oscillating movement comes to a stand still which means that the pins of the levers 5 exert a pressure on the sides of groove 4 which works towards concentric position of groove 4 with regard to centre 1', whereas with increasing number of revolutions of driving shaft 1 disc 3 because of its being journalled eccentrically swings outwardly revolving around disc 2, thus working towards increase in the eccentricity of groove 4 relative to shaft 1 and its centre 1'. Thus the retarding influence of the resistance offered by the driven shaft and the centrifugal force created by the driving shaft in dependency on its number of revolutions re-act each other with the result that automatically that ratio of transmission is working which corresponds to the conditions prevailing at that time.

Figure 3:
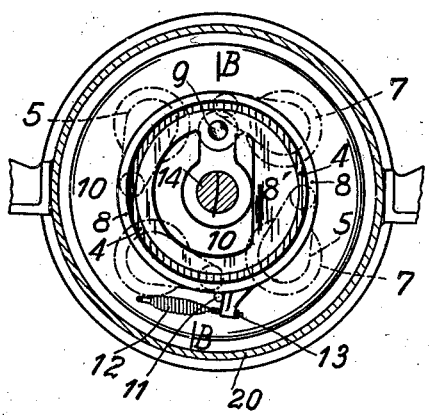
Figs. 3 and 4 show a one way drive power transmission in which these parts are contained so that it works in accordance with the inventive idea.
Figure 4:
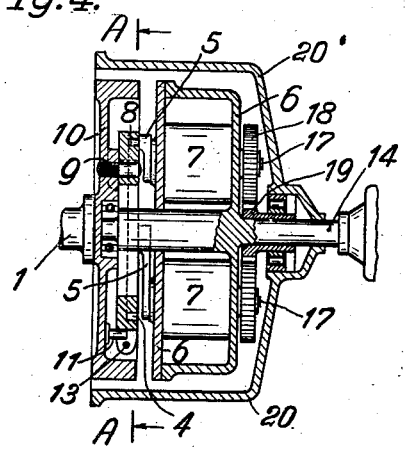

The example shown in Figs. 3 and 4 is substantially like the one just described, except that now the idling position is represented and more details are given. Again 1 is the driving shaft to which a disc-like element 10 is fastened which, for example, may be a flywheel. A bolt or pin 9 rigidly connected to part 10 fits into a corresponding hole in disc 8. This disc 8 has a groove 4 and an eccentric weight 8'. Into the groove 4 fit the pins of levers 5 which form part of the one way drive mechanisms 7. These are journaled in casing 6 and their rear axles 17 are provided with gears 18 engaging with a sun wheel 19 which is in rigid connection with the stationary casing 20. The driven shaft 14 working for example on the rear axle of an automobile (not represented) is rigidly connected with casing 6. Its left hand end is journaled by means of a roller bearing, for example, in a recess of part 10.

A free wheel mechanism may be inserted between sun wheel 19 and the casing 20 allowing for the sun wheel to revolve with the driven shaft as soon as driving and driven safts have attained substantially equal speed of rotation, as explained in the co-pending application, Ser. No. 241,854 of one of the joint inventors of this application.

Besides, it may be advisable to have a pin 11 on part 10 against which a corresponding projection of part 8 bears in idling position. Furthermore a spring 12 may be provided tending to prevent or reduce the centrifugal force to have effect on part 8 thus limiting its action in any desired way. In addition the tension in this spring may be adjustable by means of a screw 13.

This entire mechanism will work in the following way:

When the number of revolutions of shaft 1 is high enough to cause disc 8 to swing out eccentrically levers 5 will be made to oscillate and to drive the one way drive mechanisms 7. These transmit rotation to their gears 18 and by reaction on sun wheel 19 casing 6 and at the same time shaft 14 will be caused to rotate. As explained above the resistance offered by shaft 14 will tend to reduce the stroke length of levers 5 whereas the increase in revolving speed of shaft 1 tends to increase said stroke.

We do not want to be limited to the details described or shown in the drawings as many variations will occur to those skilled in the art.

What we claim is:

1. A one way drive power transmission comprising a driving shaft and a driven shaft, an element eccentrically pivoted on said driving shaft, a unidirectional driving device having a lever adapted to be oscillated by means of said eccentric element, a centrifugal weight on said driving shaft adapted to vary the eccentricity of said eccentric element, means for transmitting the driving force from said unidirectional driving device to said driven shaft, said means being adapted to transmit the reaction caused by the load on said driven shaft over said unidirectional driving device to said lever thereof.

2. A one way drive power transmission comprising a driving shaft and a driven shaft, an element eccentrically pivoted on said driving shaft, a unidirectional driving device having a lever adapted to be oscillated by means of said eccentric element, a centrifugal weight on said driving shaft adapted to vary the eccentricity of said eccentric element, means for transmitting the driving force from said unidirectional driving device to said driven shaft, said means being adapted to transmit the reaction caused by the load on said driven shaft over said unidirectional driving device to said lever thereof.

3. A oneway drive power transmission comprising a driving shaft and a driven shaft, an eccentric member rigidly fixed to said driving shaft, a disc eccentrically and loosely mounted on said eccentric member, said disc having its centre of gravity eccentric to its geometrical centre and having an annular groove, a unidirectional driving device comprising a lever and a pin, said pin fitting into said annular groove of said disc, power transmitting means inserted between said unidirectional driving device and said driven shaft, said means being adapted also to transmit the reaction caused by the load on said driven shaft over said unidirectional driving device to said lever thereof.

4. A one way drive power transmission comprising a driving shaft and a driven shaft, an eccentric member rigidly fixed to said driving shaft, a disc eccentrically and loosely mounted on said eccentric member, said disc having its centre of gravity eccentric to its geometrical centre and having an annular groove; the distance from the geometrical centre of said groove to the centre of said eccentric being equal to the distance between the centres of said driving shaft and of said said eccentric member, a unidirectional driving device comprising a lever and a pin, said pin fitting into said annular groove of said disc, power transmitting means inserted between said unidirectional driving device and said driven shaft, said means being adapted also to transmit the reaction caused by the load on said driven shaft over said unidirectional driving device to said lever thereof.

5. A one way drive power transmission comprising a driving shaft and a driven shaft, an eccentric member rigidly fixed to said driving shaft, a disc eccentrically and loosely mounted on said eccentric member, said disc having its centre of gravity eccentric to its geometrical centre and having an annular groove, a spring between said disc and said driving shaft, a unidirectional driving device comprising a lever and a pin, said pin fitting into said annular groove of said disc, power transmitting means inserted between said unidirectional driving device and said driven shaft, said means being adapted also to transmit the reaction caused by the load on said driven shaft over said unidirectional driving device to said lever thereof.

6. A one way drive power transmission comprising a driving shaft and a driven shaft, substantially in alignment with and abutting each other, a disc-like element rigidly fixed to said driving shaft, a pin rigidly but eccentrically fixed to said element, a second disc-like element eccentrically and loosely mounted on said pin, said second element having its centre of gravity eccentric to its geometrical centre and having an annular groove, the distances from the centre of said pin to the centre of said annular groove and to the centre of said driving shaft, respectively, being equal, an adjustable spring between said two disc-like elements, a casing in rigid connection with said driven shaft, unidirectional driving devices mounted in said casing on a circle concentrical to said driving and driven shafts, said devices comprising operating levers and pins thereon, said pins fitting into said groove, gears on said driving devices, a stationary part, a sun wheel fixed to said stationary part and being in mesh with said gears on said driving devices and adapted to resist their reaction.

ALFRED GRAF von SODEN-FRAUNHOFEN.
HUBERT FREIHERR von THÜNGEN.